(12) United States Patent
Fierro et al.

(10) Patent No.: US 10,646,955 B2
(45) Date of Patent: May 12, 2020

(54) VALVE NEEDLE FOR A FLUID INJECTION VALVE

(71) Applicant: Continental Automotive GmbH, Hannover (DE)

(72) Inventors: Maria Carmela Fierro, Pisa (IT); Walter Becuzzi, Rosignano Solvay (IT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 107 days.

(21) Appl. No.: 15/761,517

(22) PCT Filed: Aug. 25, 2016

(86) PCT No.: PCT/EP2016/070090
§ 371 (c)(1),
(2) Date: Mar. 20, 2018

(87) PCT Pub. No.: WO2017/050521
PCT Pub. Date: Mar. 30, 2017

(65) Prior Publication Data
US 2019/0054563 A1    Feb. 21, 2019

(30) Foreign Application Priority Data
Sep. 21, 2015  (EP) .................................. 15186020

(51) Int. Cl.
*B23K 26/06* (2014.01)
*B23K 26/10* (2006.01)
(Continued)

(52) U.S. Cl.
CPC .......... *B23K 26/0619* (2015.10); *B23K 26/08* (2013.01); *B23K 26/082* (2015.10);
(Continued)

(58) Field of Classification Search
CPC .................. B23K 26/0619; B23K 26/082; B23K 26/242; B23K 26/103; B23K 26/28;
(Continued)

(56) References Cited

U.S. PATENT DOCUMENTS 5,178,362 A      1/1993  Vogt et al. ................ 251/129.21
6,199,776 B1 *   3/2001  Andorfer ........... F02M 51/0667
                                                        239/585.1
(Continued)

FOREIGN PATENT DOCUMENTS

CN    103119282 A     5/2013  ............. F02M 51/06
DE    102005000631 A1  7/2006  ............. B23K 26/10
(Continued)

OTHER PUBLICATIONS

Chinese Office Action, Application No. 201680054958.6, 9 pages, dated Mar. 4, 2019.
(Continued)

*Primary Examiner* — Christopher S Kim
(74) *Attorney, Agent, or Firm* — Slayden Grubert Beard PLLC

(57) ABSTRACT

The present disclosure relates to fluid injection valves. Embodiments of the teachings thereof may include a valve needle for a fluid injection valve and a fluid injection valve. For example, a valve needle for a fluid injection valve may include: a needle shaft; and a sealing ball welded to a tip of the needle shaft. The welded joint between the sealing ball and the needle shaft comprises at least two separate weld seams extending along a perimeter of the valve needle in the form of c-shaped arcs.

11 Claims, 4 Drawing Sheets

(51) Int. Cl.
    *B23K 26/28*     (2014.01)
    *F02M 61/16*     (2006.01)
    *F02M 61/18*     (2006.01)
    *B23K 26/242*     (2014.01)
    *B23K 26/082*     (2014.01)
    *B23K 26/08*     (2014.01)
    *B23K 31/00*     (2006.01)
    *B23K 101/00*     (2006.01)
    *B23K 103/04*     (2006.01)

(52) U.S. Cl.
    CPC .......... *B23K 26/103* (2013.01); *B23K 26/242* (2015.10); *B23K 26/28* (2013.01); *F02M 61/168* (2013.01); *F02M 61/188* (2013.01); *B23K 31/003* (2013.01); *B23K 2101/00* (2018.08); *B23K 2103/05* (2018.08); *F02M 2200/8084* (2013.01)

(58) Field of Classification Search
    CPC ............ B23K 2101/00; B23K 2103/05; B23K 31/003; F02M 61/168; F02M 61/188; F02M 2200/8084
    USPC .................................. 239/585.1–585.5, 900
    See application file for complete search history.

(56) References Cited

U.S. PATENT DOCUMENTS

| | | | |
|---|---|---|---|
| 6,676,046 B2 * | 1/2004 | Brooks | F02M 51/0682 |
| | | | 239/585.4 |
| 7,506,826 B2 * | 3/2009 | Miller | B05B 1/302 |
| | | | 239/585.1 |
| 9,376,994 B2 | 6/2016 | Grandi et al. | 239/585.1 |
| 2012/0061878 A1 | 3/2012 | Hofmann et al. | 264/400 |

FOREIGN PATENT DOCUMENTS

| | | | | |
|---|---|---|---|---|
| DE | 102009021788 A1 | 11/2010 | ............. | B23K 26/28 |
| DE | 102010063306 A1 | 6/2012 | ............. | F02M 55/02 |
| EP | 2803850 A1 | 11/2014 | ............. | F02M 51/06 |
| WO | 2017/050521 A1 | 3/1917 | ............. | B23K 26/06 |
| WO | 91/14864 A1 | 10/1991 | ............. | B23K 26/28 |
| WO | 2010/130255 A1 | 11/2010 | ............. | B23K 26/06 |
| WO | 2013/167597 A1 | 11/2013 | ............. | F02M 51/06 |

OTHER PUBLICATIONS

Extended European Search Report, Application No. 15186020.2, 7 pages, dated Apr. 7, 2016.
International Search Report and Written Opinion, Application No. PCT/EP2016/070090, 11 pages, dated Oct. 6, 2016.

* cited by examiner

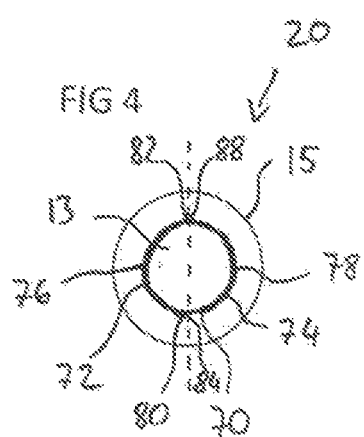

VALVE NEEDLE FOR A FLUID INJECTION VALVE

CROSS-REFERENCE TO RELATED APPLICATIONS

This application is a U.S. National Stage Application of International Application No. PCT/EP2016/070090 filed Aug. 25, 2016, which designates the United States of America, and claims priority to EP Application No. 15186020.2 filed Sep. 21, 2015, the contents of which are hereby incorporated by reference in their entirety.

TECHNICAL FIELD

The present disclosure relates to fluid injection valves. Embodiments of the teachings thereof may include a valve needle for a fluid injection valve and a fluid injection valve.

BACKGROUND

A typical valve needle for a fluid injection valve comprises a needle shaft and a sealing ball welded to a tip of the needle shaft. Both parts are usually made from stainless steel.

WO 91/14864 A1 discloses a solenoid valve with an armature which acts on a valve closure body by means of a connecting tube. The metallic valve closure body is first provided with a spot weld which is then welded to the metallically softer connecting tube by a second spot weld until the at least partially surrounding weld seam which ensures a safe and reliable connection is formed between the valve closure body (35) and the connecting tube. The welding is conventionally performed by laser welding, where the parts are rotated.

Conventionally, laser welding requires a tooling for maintaining both parts in contact, a rotating motor spindle and a beam laser transporter, which is commonly an optic fiber and focus optical group. To weld the sealing ball to the needle, the parts are pressed, put into a synchronized and coaxial rotation and then the laser welding is performed by a stationary laser. Such an axial-symmetric laser welding can be affected by parts distortion due to thermal stress and/or excessive eccentricity due to the rotation of the parts during welding. To prevent this, document DE 10 2005 000 631 A1 suggests moving the laser beam around the stationary workpiece by using a mirror arrangement. This is, however, a rather complicated setup and does not solve problems related to thermal stress during the welding process.

SUMMARY

The teachings of the present disclosure may provide a valve needle for a fluid injection valve and a fluid injection valve with an improved welded joint. Some embodiments may include a method for manufacturing a valve needle for a fluid injection valve that does not require a complex setup and is fast.

For example, some embodiments may include a valve needle (20) for a fluid injection valve (10) comprising a needle shaft (13) and a sealing ball (15) welded to a tip (17) of the needle shaft (13). The welded joint (19) between the sealing ball (15) and the needle shaft (13) comprises at least two separate weld seams (72, 74), which extend along the perimeter of the valve needle (20) in the form of a c-shaped arc.

In some embodiments, the weld seams (72, 74) are mirror inverted.

In some embodiments, the welded joint (19), by means of the weld seams (72, 74), has a 2-fold rotational symmetry.

In some embodiments, the welded joint (19) comprises two semicircular C-shaped arcs.

In some embodiments, the cross section of the weld seams (72, 74) is uniform along its linear expansion.

In some embodiments, the cross section of the weld seams (72, 74) varies with the distance from a central portion (76, 78) of the c-shaped arc.

Some embodiments may include a fluid injection valve (10) with a valve needle (20) as described above.

As another example, some embodiments may include a method for manufacturing a valve needle (20) for a fluid injection valve (10) comprising welding a sealing ball (15) to a tip (17) of a needle shaft (13). The welding is performed by at least two laser beams (58, 60), which are directed towards the joint (19) between the sealing ball (15) and the needle shaft (13) from opposite sides, wherein the welding is performed by scanning each laser beam (58, 60) along a portion of the joint (19).

In some embodiments, the sealing ball (15) and the needle shaft (13) are held at rest while the at least two laser beams (58, 60) are scanned along the respective portions of the joint (19).

In some embodiments, the scanning is performed by moving a laser scanning head (54, 56) of a laser welding apparatus laterally from one side to the other, thereby moving the laser beam (58, 60) along a c-shaped region with varying angles of incidence.

In some embodiments, the scanning is performed in a way to ensure an even application of energy along the c-shaped region.

In some embodiments, the duration of exposure to the laser beam (58, 60) is varied depending on the angle of incidence.

In some embodiments, the intensity of the laser beam (58, 60) is varied depending on the angle of incidence.

In some embodiments, the scanning is performed in such a way that the point of incidence of a first laser beam (58) is always opposite to the point of incidence of a second laser beam (60).

As another example, some embodiments may include a computer program product comprising a computer readable medium bearing computer program code embodied therein for executing the method described above.

BRIEF DESCRIPTION OF THE DRAWINGS

Advantages and developments of the valve needle for a fluid injection and the method for manufacturing a valve needle for a fluid injection valve will become apparent from the exemplary embodiments which are described below in association with schematic figures.

FIG. 4 shows a weld seam resulting from the manufacturing process according to FIGS. 2 and 3.

Figure 1:
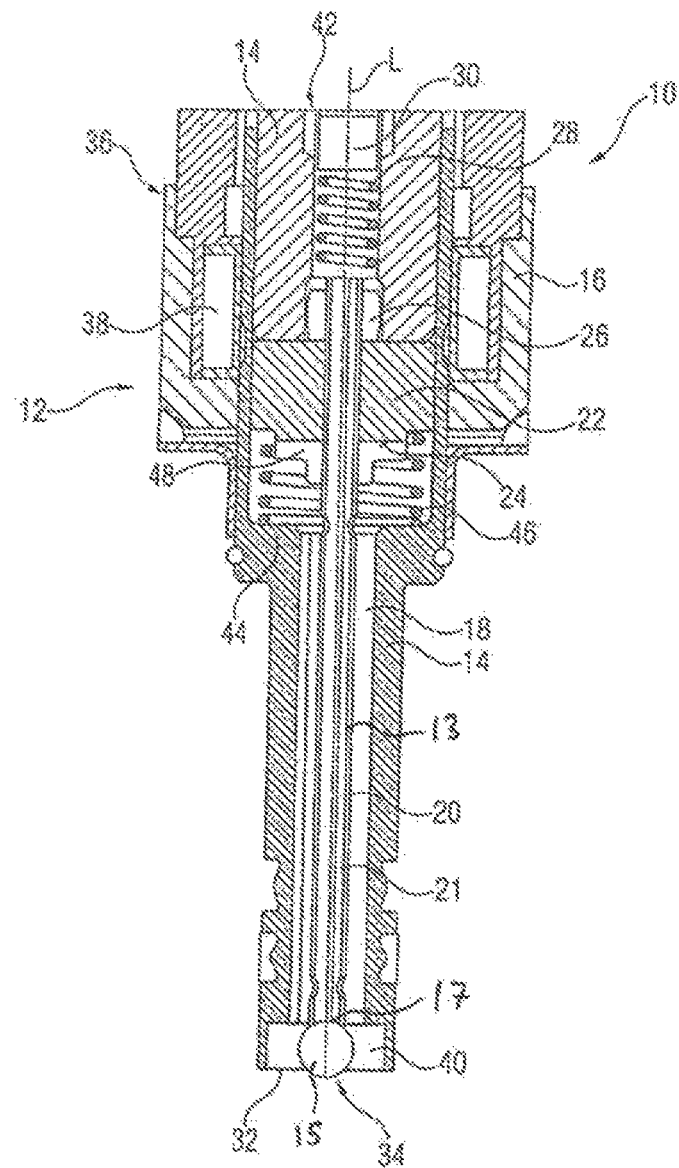
FIG. 1 shows a cross sectional view of an injection valve with a valve needle according to teachings of the present disclosure.

Elements of the same design and function that appear in different illustrations are identified by the same reference symbol.

DETAILED DESCRIPTION

Some embodiments may include a valve needle for a fluid injection valve. The valve needle comprises a needle shaft and a sealing ball welded to a tip of the needle shaft. The welded joint between the sealing ball and the needle shaft comprises at least two separate weld seams, which extend along the perimeter of the valve needle in the form of a c-shaped arc.

A c-shaped arc is hereby defined as an arc in the form of a "c", i.e. an arc that has a uniform curvature and extends in an angular range between 90 and 180 degrees. The arc may include any range from a semicircle to a quarter circle. Even if both arcs extend in an angular range of 180 degrees and adjoin one another, it is possible to recognize the two separate weld seams because of the distinct beginning and termination of a weld seam.

The valve needle may be welded by a method described below, in which the parts are held stationary and at least two laser beams are used for welding. The two laser beams are applied from opposite sides, with respect to a plane comprising a longitudinal axis of the needle shaft. For example, they may be displaced by exactly 180 degrees with respect to the longitudinal axis.

The at least two laser beams scan the joint between the needle shaft and the sealing ball to create the weld seam. Scanning means moving the laser beams laterally from left to right or reverse with respect to the symmetry axis of the valve needle. The symmetry axis may be the longitudinal axis of the needle shaft.

The valve needle is the product of a method that does not require rotating or moving the parts to be welded. The teachings herein may reduce thermal stress resulting from welding by a double, symmetrical laser beam which ensures a symmetrical heat input. This minimizes misalignment due to shrinkage in the metal cooling phase. In some embodiments, the valve needle has the advantage that the weld seam is very precise and durable.

In some embodiments, the weld-seams are mirror-inverted. In some embodiments, by means of the weld seams, the welded joint has a 2-fold rotational symmetry with respect to the longitudinal axis. A 2-fold rotational symmetry means that an object is not changed by a rotation of an angle of 360°/2 or a multiple thereof, but the object is not rotational invariant, i.e. it is changed by a rotation of an angle different from the above-mentioned angles of n*360°/2, n being a natural number.

In some embodiments, the welded joint comprises two semicircular C-shaped arcs. To achieve this, two laser beams are used which each scan an angle of 180 degrees to achieve a 360 degree weld seam. This embodiment requires only two laser beams from opposite sides of the workpiece. In other embodiments, more than two laser beams may be used for welding, e.g. three or four.

In some embodiments, the cross sections of the weld seams are uniform along its linear expansion. The cross section of a weld seam is affected by the application of energy, e.g. by the angle of incidence of radiation. To achieve a uniform cross section, the application of energy is uniform along the expansion of the arc, i.e. the angle of incidence of the laser radiation and the beam energy are uniform. Such a valve needle exhibits a very uniform weld seam with equal quality along its extension. To achieve this, the angles of incidence may be adapted during scanning by tilting the scanning heads.

In some embodiments, the cross sections of the weld seams vary with the distance from a central portion of the c-shaped arc. Such a valve needle may be manufactured by displacing the laser beams only laterally, so that the angle of incidence varies. While it may be 0 degrees in a central portion of the c-shaped arc, it will be up to 90 degrees at the beginning and the termination of the weld seams. Therefore, the energy application varies considerably with the distance from the central portion. It has been found that a weld seam with a varying cross section exhibits a high quality. It does not require the adaption of the angle of incidence while scanning. Its method of manufacture therefore is simple and fast.

In some embodiments, there is a fluid injection valve with the described valve needle. The fluid injection valve comprises a sealing ball welded to the tip of the needle shaft very precisely as described above.

Some embodiments may include a method for manufacturing a valve needle for a fluid injection valve. Some embodiments may include a laser welding apparatus, which may expediently be configured for performing the methods described herein.

In some embodiments, a method comprises welding a sealing ball to a tip of a needle shaft, by welding with at least two laser beams, which are directed towards the joint between the sealing ball and the needle shaft from opposite sides. The welding is performed by scanning each laser beam along a portion of the joint. Expediently, the at least two laser beams may be scanned along the respective portions of the joint at the same time.

The methods do not require a complex optical setting, e.g. a mirror arrangement. Instead, conventional scanning heads may be used. It is therefore a low-cost solution for high precision welding. Cycle time can be reduced compared to a conventional laser welding process due to the absence of acceleration and deceleration of rotating parts and due to the high welding speed of laser scanning heads. The sealing ball and the needle shaft may be held at rest while the at least two laser beams are scanned along the respective portions of the joint. In some embodiments, the sealing ball and the needle shaft are not rotated or moved during the welding.

In some embodiments, the scanning is performed by moving a laser scanning head of the laser welding apparatus laterally from one side to the other, thereby moving the laser beam along a c-shaped region with varying angles of incidence. This method is very simple because it only requires lateral displacement of the laser beam.

In some embodiments, the scanning is performed in a way to ensure an even application of energy along the c-shaped region. This ensures a uniform quality of the weld seam. To achieve an even application of energy in a case where the laser beam is moved along a c-shaped region with varying angles of incidence, the duration of exposure to the laser beam may be varied depending on the angle of incidence. In some embodiments, the intensity of the laser beam may be varied depending on the angle of incidence.

In some embodiments, the point of incidence of a first laser beam is always opposite to the point of incidence of a second laser beam with respect to a plane comprising a longitudinal axis of the needle shaft. In such embodiments, the two points of incidence are displaced by 180 degrees with respect to the longitudinal axis of the needle shaft. This ensures a symmetrical heat input and helps avoid distortion or misalignment of the parts due to thermal stress.

Some embodiments may include a computer program product comprising a computer readable medium bearing computer program code embodied therein for executing the method described above. The computer readable medium may be a storage unit of a control unit, e.g. a control unit of the laser welding apparatus. The computer program product enables the laser welding apparatus to perform the described method.

In some embodiments, an injection valve 10 suitable for dosing fuel to an internal combustion engine comprises a valve assembly 12. The valve assembly 12 comprises a valve body 14 with a central longitudinal axis L. A housing 16 is partially arranged around the valve body 14. The valve body 14 comprises a cavity 18. The cavity 18 has a fluid outlet portion 40. The fluid outlet portion 40 communicates with a fluid inlet portion 42 which is provided in the valve body 14. The fluid inlet portion 42 and the fluid outlet portion 40 are positioned at opposite axial ends of the valve body 14. The cavity 18 takes in a valve needle 20. The valve needle 20 is hollow and has a recess 21 which extends in direction of the central longitudinal axis L over a portion of the axial length of the valve needle 20 or over the whole axial length of the valve needle 20.

In some embodiments, the valve needle 20 comprises a needle shaft 13 and a sealing ball 15 welded to the tip 17 of the needle shaft 13. The needle shaft 13 and the sealing ball 15 are both made from stainless steel. The welded joint of the needle shaft 13 and the sealing ball 15 comprises two separate c-shaped arcs which are semicircular and not shown in FIG. 1.

In some embodiments, the valve assembly 12 comprises an armature 22. The armature 22 is axially movable in the cavity 18. The armature 22 is separate from the valve needle 20 and is axially movable relative to the valve body 14 and, in the present embodiment, also be axially movable relative to the valve needle 20. The armature 22 has a lower surface 24 which faces towards the fluid outlet portion 40.

Furthermore, the valve assembly 12 may comprise a retainer 26. The retainer 26 is formed as a collar around the valve needle 20 and is fixedly coupled to the valve needle 20. Alternatively, the retainer 26 may be in one piece with the valve needle, for example the valve needle 20 may have a shaft portion and a collar portion, representing the retainer 26, at an end of the shaft which faces towards the fluid inlet portion 42. The retainer 26 is separate from the armature 22. The retainer 26 interacts with an inner surface of the valve body 14 to guide the valve needle 20 in axial direction inside the valve body 14. For example, the retainer 26 may be in contact, e.g. in sliding contact, with the inner surface of the valve body 14 for axially guiding the valve needle 20.

A main spring 28 may be arranged in the cavity 18 of the valve body 14. The retainer 26 forms a first seat for the main spring 28. A filter element 30 is arranged in the valve body 14 and forms a further seat for the main spring 28. During the manufacturing process of the injection valve 10 the filter element 30 can be moved axially in the valve body 14 to preload the main spring 28 in a desired manner. By this the main spring 28 exerts a force on the valve needle 20 towards an injection nozzle 34 of the injection valve 10.

In a closing position of the valve needle 20, it sealingly rests on a seat plate 32 having at least one injection nozzle 34. The fluid outlet portion 40 is arranged near the seat plate 32. In the closing position of the valve needle 20 a fluid flow through the at least one injection nozzle 34 is prevented. The injection nozzle 34 may be, for example, an injection hole. However, it may also be of some other type suitable for dosing fluid.

The valve assembly 12 may include an actuator unit 36 including an electro-magnetic actuator. The electro-magnetic actuator unit 36 comprises a coil 38 arranged inside the housing 16. Furthermore, the electro-magnetic actuator unit 36 comprises the armature 22. The housing 16, parts of the valve body 14 and the armature 22 are forming a magnetic circuit.

In some embodiments, a step 44 is arranged inside the valve body 14. An armature spring 46 is arranged in the cavity 18. The step 44 forms a seat for the armature spring 46. In other words, the cavity 18 has a step 44 which forms a seat for the armature spring 46. The armature spring 46 is preferably a coil spring.

The armature spring 46 biases the armature 22 in contact with the retainer 26. When the coil 38 is energized to move the armature 22, the armature 22—by means of a form-fit engagement with the retainer 26—takes the valve needle 20 with it away from the closing position to enable fluid flow through the at least one injection nozzle 34.

Figure 2:
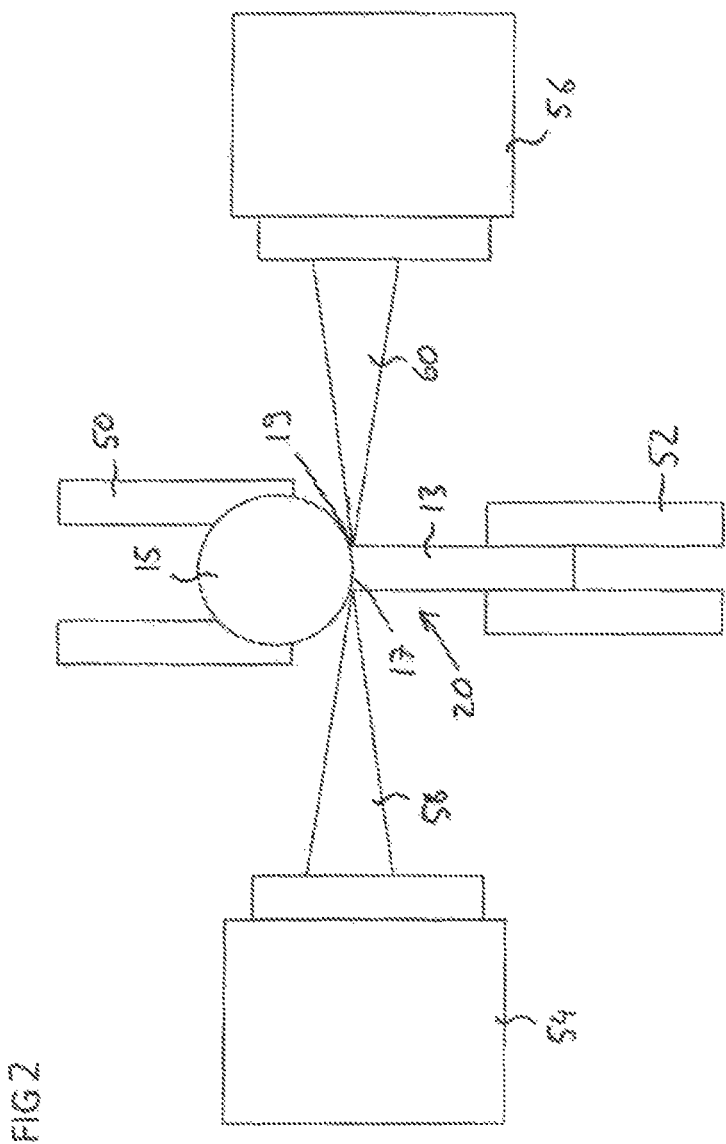
FIG. 2 shows a side view of a valve needle according to teachings of the present disclosure during a manufacturing process.

FIG. 2 schematically illustrates a manufacturing process for the valve needle 20 according to an example method, in particular the step of welding the sealing ball 15 to the tip 17 of the needle shaft 13. The sealing ball 15 is held in position by upper clamping means 50 and the needle shaft 13 is held in position by lower clamping means 52. The welding is performed by directing two laser beams 58 and 60 at the joint 19 between the sealing ball 15 and the needle shaft 13 from opposite sides. The first laser beam 58 is directed by a first laser scanning head 54 and the second laser beam 60 is directed by a second laser scanning head 56. Other parts of the laser welding apparatus, e.g. the laser source, beam guides and a control unit, are not shown in the figures.

Figure 3:
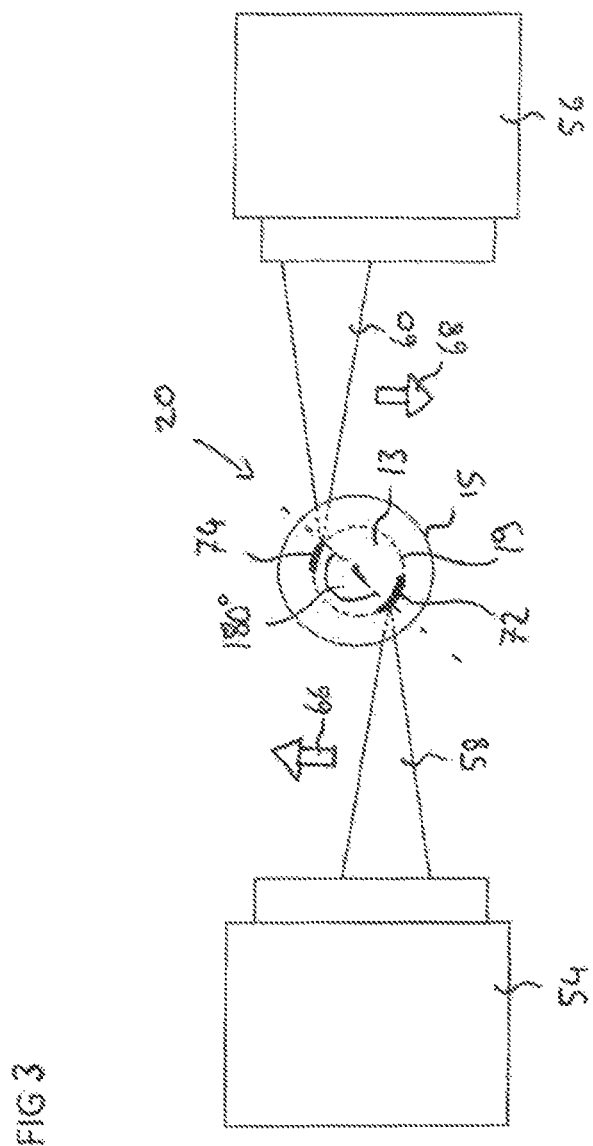
FIG. 3 shows a top view of the valve needle according to FIG. 2 during the manufacturing process.

FIG. 3 is a schematic top view of the valve needle according to FIG. 2 during the manufacturing process. In this illustration, part of the welding process has already taken place. The first laser beam 58 has already created a part of a first weld seam 72 and the second laser beam 60 has created a part of a second weld seam 74. To continue the welding, the first laser beam 58 is moved laterally to the left in the direction indicated by the arrow 66 and the second laser beam 60 is moved laterally to the left in the direction indicated by the arrow 68. The points of incidence of the two laser beams 58, 60 at the joint 19 are displaced by 180 degrees to ensure a symmetrical heat input.

In other words, the two laser beams 58, 60 are both moved such that their—imaginary—intersections with a middle plane between the laser scanning heads 54, 56 which comprises the longitudinal axis of the needle shaft 13 move symmetrically towards the longitudinal axis from opposite sides. In some embodiments, the intersections of the two laser beams 58, 60 with the middle plane and the longitudinal axis subsequently coincide.

In some embodiments, the two laser beams 58, 60 are subsequently both moved such that their intersections with the middle plane move symmetrically away from the longitudinal axis to opposite sides. The intersections with the middle plane are "imaginary" in the sense that a central axis of the respective laser beam 58, 60 intersects the middle plane while the laser beam is actually absorbed at the respective joint 19 and does not reach the middle plane.

FIG. 4 schematically shows the resulting weld seam 70. The weld seam 70, which joins the needle shaft 13 to the sealing ball 15, comprises two separate weld seams. The first weld seam 72 is created by the first laser beam 58. The second weld seam 74 is created by the second laser beam 60.

Both weld seams 72 and 74 are semicircular and in the shape of a "c", where one of them is mirror-inverted with respect to the middle plane. Both weld seams 72 and 74 comprise a central portion 76 and 78 and first end portions 80 and 88 and second end portions 82 and 84. The first end portions 80 and 88 are where the welding process according to FIG. 3 started, the second end portions 82, 84 are where it terminated. The first end portion 80 of the first weld seam 72 adjoins the second end portion 84 of the second weld seam 74. The second end portion 82 of the first weld seam 76 adjoins the first end portion 88 of the second weld seam 74.

The angles of incidence of the laser beams 58 and 60 during welding are 0 degrees in the central portions 76 and 78 and 90 degrees in the end portions 80, 82, 84 and 88.

What is claimed is:

1. A valve needle for a fluid injection valve, the valve needle comprising:
    a needle shaft; and
    a sealing ball welded to a tip of the needle shaft;
    wherein a welded joint between the sealing ball and the needle shaft comprises at least two separate weld seams extending along a circular perimeter of the valve needle,
    wherein each of the weld seams comprises a c-shaped arc having a uniform circular curvature extending along the circular perimeter of the valve needle in an angular range between 90 and 180 degrees, and
    wherein each of the weld seams is physically distinct from each other weld seam along the circular perimeter of the valve needle, to thereby define a non-continuous weld around the circular perimeter of the valve needle.

2. A valve needle according to claim 1, wherein the at least two separate weld seams are mirror images of each other.

3. A valve needle according to claim 1, wherein the welded joint has a 2-fold rotational symmetry.

4. A valve needle according to claim 1, wherein the at least two separate weld seams each comprise a semicircular C-shaped arc.

5. A valve needle according to claim 1, wherein a cross section of each of the at least two weld seams is uniform along the circular perimeter of the valve needle.

6. A valve needle according to claim 1, wherein the at least two separate weld seams includes exactly two separate weld seams.

7. A fluid injection valve comprising:
    a fluid flow inlet;
    a fluid flow outlet;
    a needle shaft; and
    a sealing ball welded to a tip of the needle shaft and configured to seal the fluid flow outlet when in a closed position;
    wherein a welded joint between the sealing ball and the needle shaft comprises at least two separate weld seams extending along a circular perimeter of the valve needle,
    wherein each of the weld seams comprises a c-shaped arc having a uniform circular curvature extending along the circular perimeter of the valve needle in an angular range between 90 and 180 degrees, and
    wherein each of the weld seams is physically distinct from each other weld seam along the circular perimeter of the valve needle, to thereby define a non-continuous weld around the circular perimeter of the valve needle.

8. A fluid injection valve according to claim 7, wherein the at least two separate weld seams are mirror images of each other.

9. A fluid injection valve according to claim 7, wherein the welded joint has a 2-fold rotational symmetry.

10. A fluid injection valve according to claim 7, wherein the at least two separate weld seams each comprise a semicircular C-shaped arc.

11. A fluid injection valve according to claim 7, wherein a cross section of each of the at least two weld seams is uniform along the circular perimeter of the valve needle.

* * * * *